(12) United States Patent
Asano

(10) Patent No.: US 6,456,392 B1
(45) Date of Patent: Sep. 24, 2002

(54) IMAGE PROCESSING APPARATUS CAPABLE OF HIGH-QUALITY IMAGE FORMATION

(75) Inventor: Masaki Asano, Nishinomiya (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/225,523

(22) Filed: Jan. 4, 1999

(30) Foreign Application Priority Data

Jan. 14, 1998 (JP) .......................................... 10-005394

(51) Int. Cl.$^7$ ................................................ G06K 1/00
(52) U.S. Cl. ........................................ 358/1.2; 358/1.1
(58) Field of Search .................... 358/1.1, 1.2, 1.9, 358/1.18, 451, 457, 218, 459, 452, 454, 458; 347/254, 131, 253, 251, 240

(56) References Cited

U.S. PATENT DOCUMENTS 5,243,441 A * 9/1993 Kamura ....................... 350/451
5,959,656 A * 9/1999 Dhong et al. ................ 347/254

FOREIGN PATENT DOCUMENTS

JP          9-267468         10/1997

* cited by examiner

Primary Examiner—Arthur G. Evans
(74) Attorney, Agent, or Firm—Sidley Austin Brown & Wood LLP

(57) ABSTRACT

The process described below is performed to output high-quality images without changing the resolution of the printer used.

A binarizing step using such a frequency modulation (FM) technique as error diffusion is performed. at a resolution higher than that which, can be output from the printer. A screen or grid corresponding to the resolution of the printer is superimposed on the binarized data. A size of a dot to be printed by the printer is obtained from the number of dots (or data indicative of a "1") contained in one square of the screen. Then the diameter of the dot is modulated while an image data is output depending on the resolution of the printer.

37 Claims, 27 Drawing Sheets

FIG. 10

Y INK

|  |  | COMPOSITION RATIO (wt%) |
|---|---|---|
| SOLVENT | WATER | 74.5 |
|  | POLYHYDRIC ALCOHOL/DEG | 11.0 |
|  | POLYHYDRIC ALCOHOL ETHER/TGB | 6.5 |
|  | THICKENER/PEG #400 | 4.5 |
| COLORING MATERIAL | DYE/Bayer Y-CA 51092 | 2.5 |
| ADDITIVE | SURFACTANT/OLFINE E1010 | 0.8 |
|  | pH ADJUSTING AGENT/NaHCO$_3$ | 0.2 |

FIG. 11

M INK

|  |  | COMPOSITION RATIO (wt%) |
|---|---|---|
| SOLVENT | WATER | 74.5 |
|  | POLYHYDRIC ALCOHOL/DEG | 11.0 |
|  | POLYHYDRIC ALCOHOL ETHER/TGB | 6.5 |
|  | THICKENER/PEG #400 | 4.5 |
| COLORING MATERIAL | DYE/BASF RED FF-3282 | 2.5 |
| ADDITIVE | SURFACTANT/OLFINE E1010 | 0.8 |
|  | pH ADJUSTING AGENT/NaHCO$_3$ | 0.2 |

FIG. 12

C INK

|  |  | COMPOSITION RATIO (wt%) |
|---|---|---|
| SOLVENT | WATER | 74.0 |
|  | POLYHYDRIC ALCOHOL/DEG | 11.0 |
|  | POLYHYDRIC ALCOHOL ETHER/TGB | 6.5 |
|  | THICKENER/PEG #400 | 4.5 |
| COLORING MATERIAL | DYE/Bayer CY-BG | 3.0 |
| ADDITIVE | SURFACTANT/OLFINE E1010 | 0.8 |
|  | pH ADJUSTING AGENT/$NaHCO_3$ | 0.2 |

FIG. 13

K INK

|  |  | COMPOSITION RATIO (wt%) |
|---|---|---|
| SOLVENT | WATER | 77.9 |
|  | POLYHYDRIC ALCOHOL/DEG | 6.0 |
|  | POLYHYDRIC ALCOHOL ETHER/TGB | 6.0 |
|  | THICKENER/PEG #400 | 4.5 |
| COLORING MATERIAL | DYE/Bayer BK-SP | 4.6 |
| ADDITIVE | SURFACTANT/OLFINE E1010 | 0.8 |
|  | pH ADJUSTING AGENT/$NaHCO_3$ | 0.2 |

| DOT SIZE | NUMBER OF DOTS CONTAINED IN A SQUARE | | | |
|---|---|---|---|---|
| | γ1 | γ2 | γ3 | γ4 |
| 0 | 0 | 0~2 | 0 | 0~2 |
| 1 | 1~2 | 3~6 | 1 | 3~4 |
| 2 | 3~4 | 7~8 | 2 | 5 |
| 3 | 5~6 | 9~10 | 3~4 | 6 |
| 4 | 7~8 | 11~12 | 5~6 | 7 |
| 5 | 9~10 | 13 | 7~8 | 8 |
| 6 | 11~12 | 14 | 9~10 | 9~10 |
| 7 | 13~14 | 15 | 11~13 | 12~13 |
| 8 | 15~16 | 16 | 13~16 | 14~16 |

SIZE
CHARACTERISTICS

NUMBER OF DOTS

F I G. 2 8
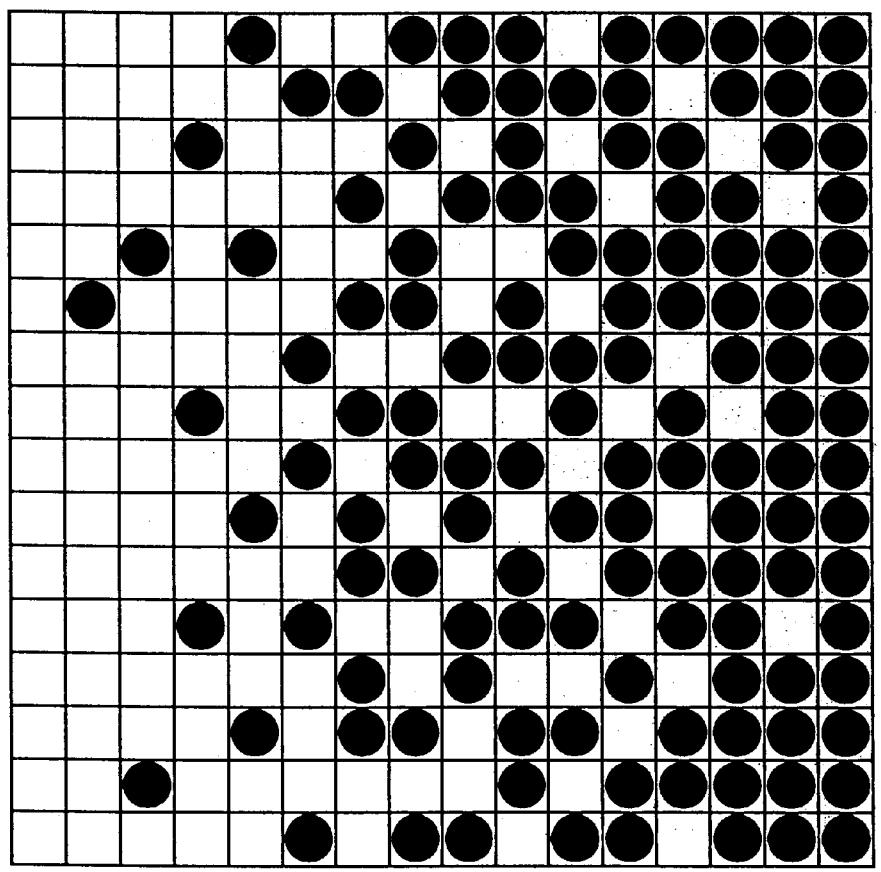

IMAGE PROCESSING APPARATUS CAPABLE OF HIGH-QUALITY IMAGE FORMATION

This application is based on Application No. 10-005394 filed in Japan, the content of which is hereby incorporated by reference.

BACKGROUND OF THE INVENTION

1. Field of the Invention

The present invention relates to image processing apparatuses, and in particular to image processing apparatuses which employ frequency modulation (FM) techniques, such as error diffusion, to provide tone process.

2. Description of the Related Art

Conventionally, FM techniques, such as error diffusion, FM screening, are known in the field of image processing. They provide tone representation by modulating a frequency which drives a print head. According to the techniques, images have darker tones at higher-frequency portions and lighter tones at lower-frequency portions.

Also known as an image processing method is a dither method which uses a dither matrix to provide a pseudo tone representation.

In printing images after this image processes, smaller dots provided more densely can provide images of higher quality. In order to provide smaller dots, however, the resolution of the printer must be increased. When an ink-jet printer has its resolution increased, its output rate is decreased. When a laser beam printer has its resolution increased, the cost of its optical system and the like is increased.

When the dither method is employed, mechanical noises of printers disadvantageously affect image quality. Error diffusion generates a patterned noise (snake noise) in intermediate tones.

SUMMARY OF THE INVENTION

The present invention has been made to overcome the above disadvantages. The present invention contemplates an image processing apparatus capable of improving image quality without changing the resolution of the printer.

The present invention also contemplates an image processing apparatus providing for image quality hardly affected by mechanical noises from the printer.

The present invention also contemplates an image processing apparatus capable of reducing a patterned noise in intermediate tones.

To achieve the above objects, in an aspect of the present invention an image processing apparatus includes a first processing unit applying a tone process on input image data, and a second processing unit determining a size of a dot to be printed from the data of a plurality of pixels included in image data having been subjected to the tone process.

In another aspect of the present invention an image processing method includes the steps of: applying a tone process on input image data; and determining a size of a dot to be printed from data of a plurality of pixels included in image data having been subjected to the tone process.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 10 describes a composition of yellow ink.

FIG. 11 describes a composition of magenta ink.

FIG. 12 describes a composition of cyan ink.

FIG. 13 describes a composition of black ink.

FIG. 28 shows an image output according to error diffusion employing uniform dots conventionally used.

DESCRIPTION OF THE PREFERRED EMBODIMENTS

Reference will now be made to the drawings to describe a printer provided with image processing apparatuses according to the preferred embodiments of the present invention.

First Embodiment

Figure 1:
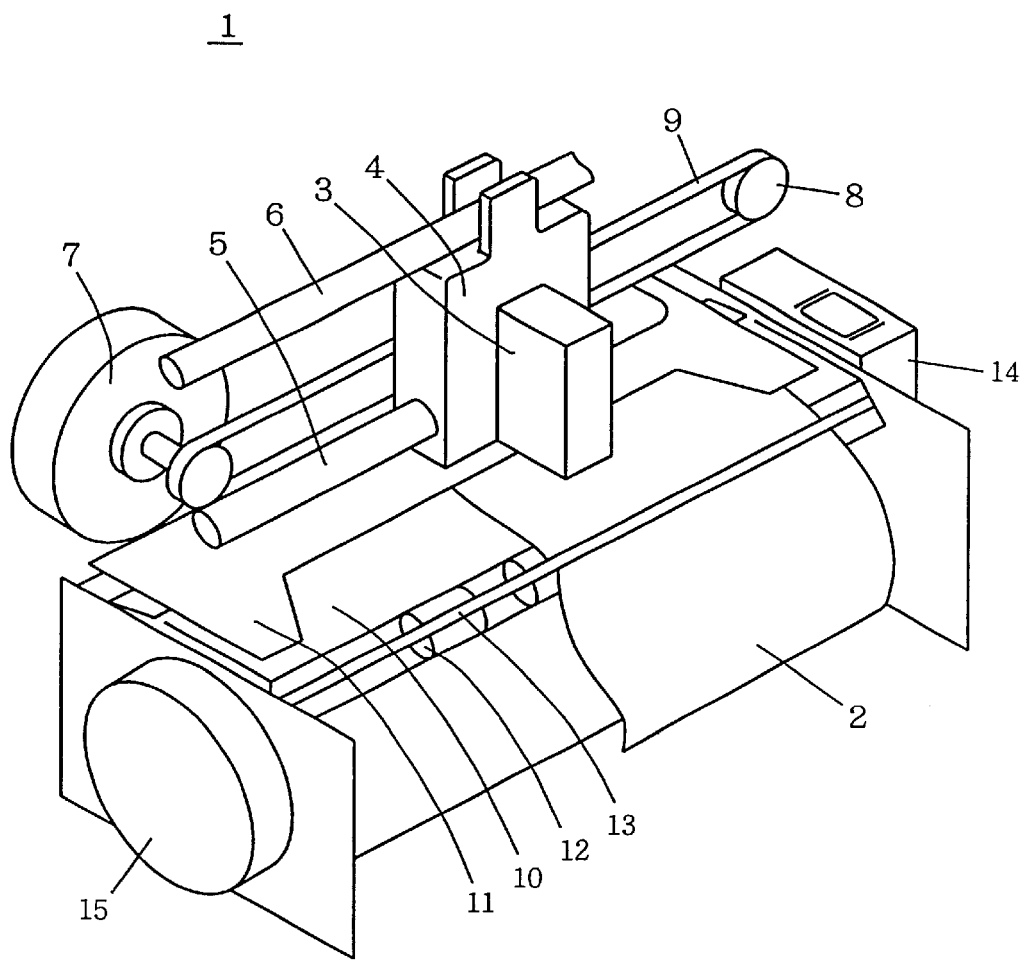
FIG. 1 is a perspective view of an ink jet printer according to a first embodiment of the present invention.

FIG. 1 is a perspective view showing a schematic structure of an ink jet printer 1 according to a first embodiment of the present invention.

Ink jet printer 1 includes a printer head 3 provided as an ink-jetting printer head, a carriage 4 which holds printer head 3, rods 5 and 6 along which carriage 4 reciprocates parallel to a recording surface of a recording sheet 2 corresponding to a recording medium, such as a paper sheet, a thin plastic plate, an OHP sheet and a roll of sheet, a drive motor 7 for driving carriage 4 so that carriage 4 reciprocates along rods 5 and 6, a timing belt for transforming the rotation of drive motor 7 into the reciprocation of carriage 4, and an idle pulley 8.

Ink jet printer 1 also includes a platen 10 also serving as a guiding plate which guides recording sheet 2 along a transport path, a sheet pressing plate 11 which coordinates with platen 10 to press recording sheet 2 against platen 10 to prevent recording sheet 2 from lifting off platen 10, a discharging roller 12 for discharging recording sheet 2, a spurring roller 13, a recovery system 14 washing the printer head 3 nozzle surface for jetting ink to recover a satisfactory amount of ink jetted, and a sheet feeding knob 15 for manually transporting recording sheet 2.

Recording sheet 2 is fed manually or via a sheet feeding device such as a cut-sheet feeder to the recording position at which printer head 3 and platen 10 face each other, while the rotatability of a sheet feeding roller (not shown) is controlled to control the sheet transportation to the recording position.

Printer head 3 includes a piezoelectric element (PZT). Voltage is applied to the piezoelectric element to distort the piezoelectric element.

The distortion changes the volume of a channel filled with ink. The change of the volume allows the ink to be jetted from a nozzle provided at the channel so that an image is recorded on recording sheet 2.

Carriage 4, driven by drive motor 7, idle pulley 8 and timing belt 9, subjects recording sheet 2 to main scan in the lateral direction of recording sheet 2 (or the transverse direction of recording sheet 2) and printer head 3 mounted on carriage 4 records one line of image. Each time one line of image is completely recorded, recording sheet 2 is fed in the longitudinal direction thereof and subjected to subscan so that the subsequent line of image is recorded thereon.

Thus an image is recorded on recording sheet 2. Recording sheet 2 which has passed across the recording position is discharged via discharging roller 12 and spurring roller 13 pressed against discharging roller 12, both arranged downstream in the direction of the sheet transportation.

Figure 2:
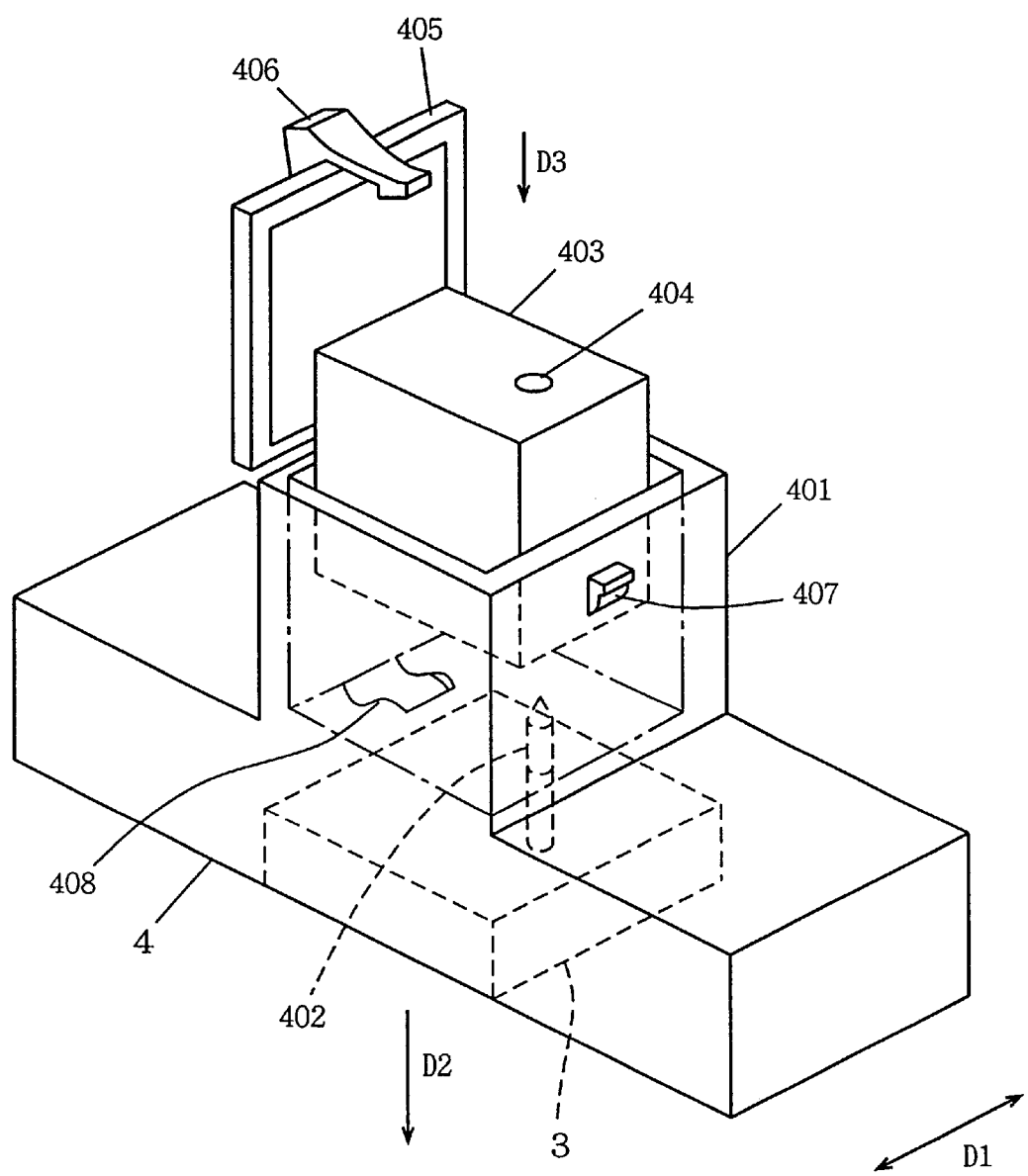
FIG. 2 is a perspective view of the FIG. 1 printer head 3.

FIG. 2 is a perspective view for illustrating the configuration of a periphery of carriage 4.

In the periphery of carriage 4 are included a casing 401 which accommodates an ink cartridge 403 for storing ink, a lid 405 of casing 401, a pin 402 which allows ink cartridge 403 to be mounted removably and also receives and feeds ink to printer head 3, a biased clasp 406 for fastening lid 405 to casing 401 when lid 405 is closed, a piece 407 which engages with biased clasp 406, and a spring plate 408 which coordinates with lid 405 to hold ink cartridge 403 while pressing ink cartridge 403 in the direction opposite to the direction in which ink cartridge 403 is stored (i.e. the direction indicated by an arrow D3). When carriage 4 moves in the direction indicated by an arrow D1 shown in FIG. 2, main scan is performed and ink drops are jetted in the direction of arrow D2.

Figure 3:
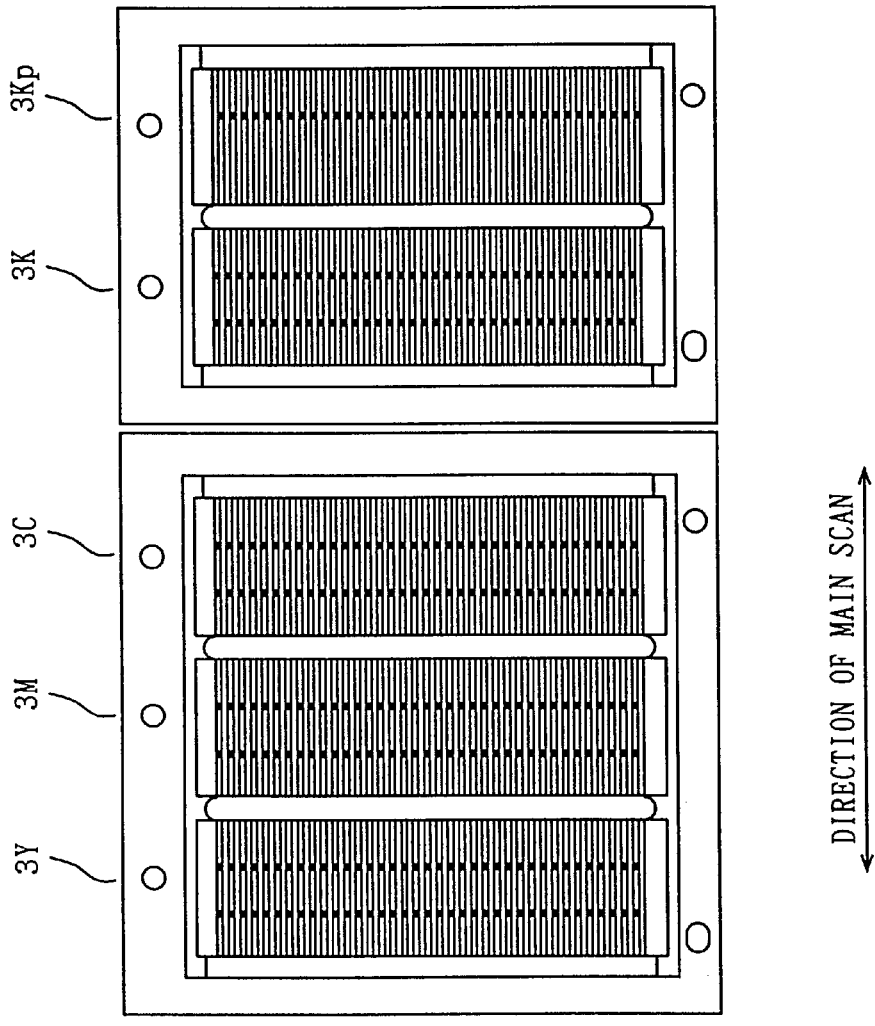
FIG. 3 is a plan view of printer head 3 as seen from the direction of its nozzle surface.

FIG. 3 shows the FIG. 1 printer head 3 as seen from a side thereof having a nozzle provided thereon.

Referring to FIG. 3, printer head 3 includes a head 3Y for yellow ink, a head 3M for magenta ink and a head 3C for cyan ink which respectively jet yellow ink, magenta ink and cyan ink, and a head 3K for black ink which jets black ink.

It should be noted that although the present invention does not employ photo ink, the present invention is applicable to printers which employ photo ink.

Figure 4:
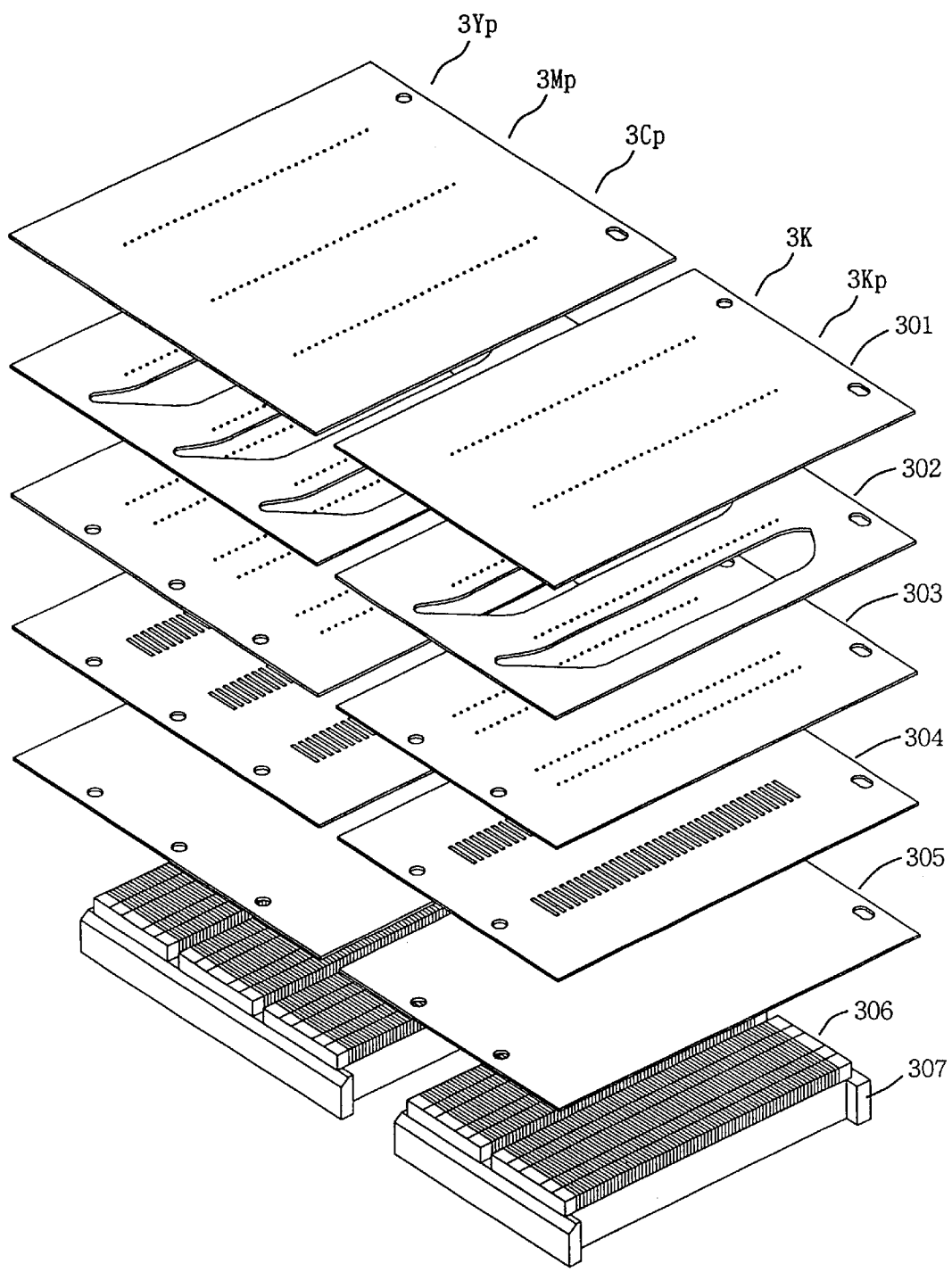
FIG. 4 is an exploded, perspective view of printer head 3.
Figure 5:
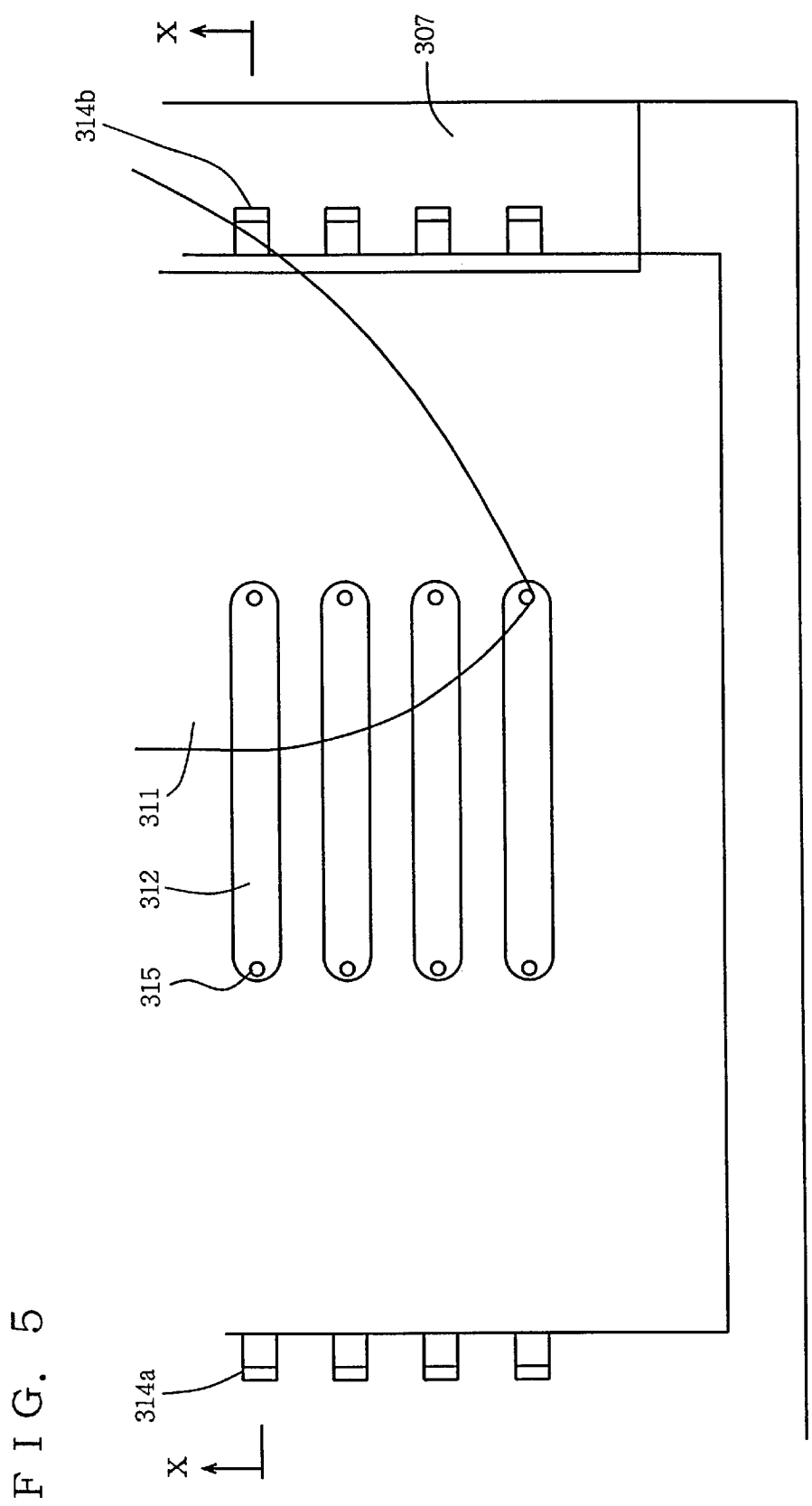
FIG. 5 is a plan view for illustrating an ink flow path in printer head 3.
Figure 6:
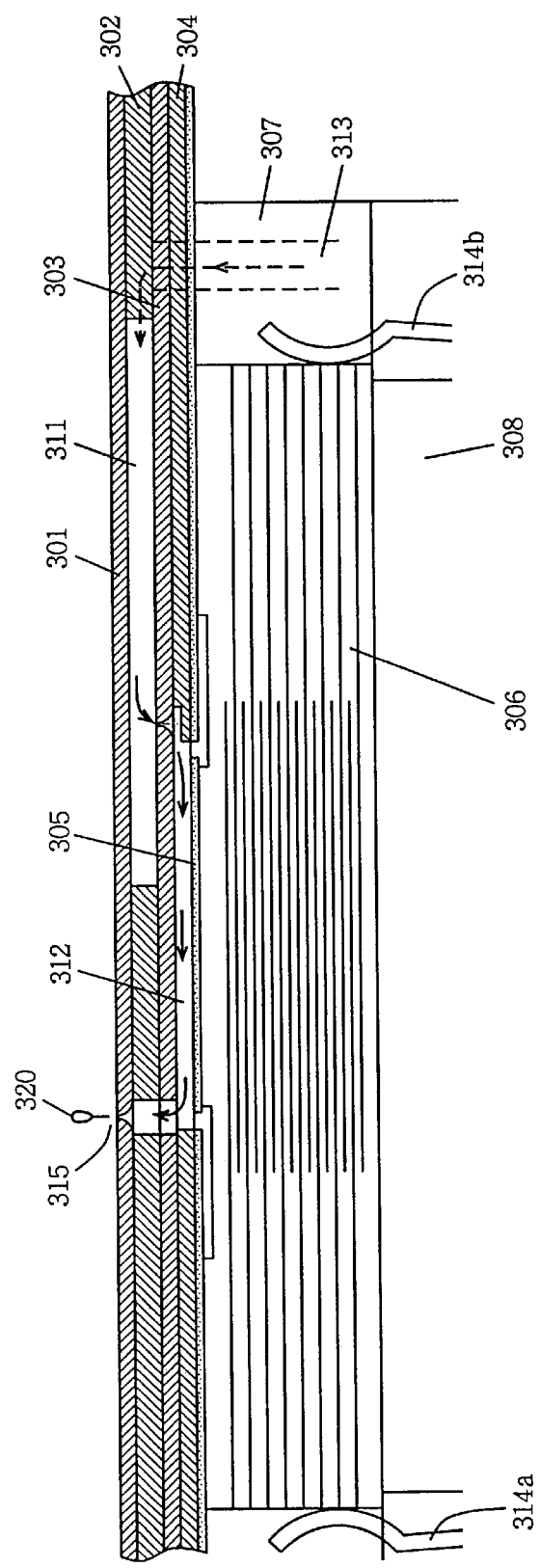
FIG. 6 is a cross section taken along line X—X of FIG. 5.

FIG. 4 is an exploded, perspective view of a portion of the FIG. 3 printer head 3. FIG. 5 is a plan view of printer head 3 as seen from the nozzle plate 301 side, for illustrating the flow of ink in printer head 3. FIG. 6 is a cross section taken along line X—X of FIG. 5.

Referring to the figures, the printer head is configured by a head holder 307, a piezoelectric element (PZT) 306, a diaphragm 305, a channel plate 304, an inlet plate 303, a shared ink-chamber plate 302 and a nozzle plate 301 that are deposited successively from the bottom.

PZT 306 is connected to lead frames 314a, 314b.

As shown in FIG. 6, the deposition of all of the parts allows an ink introducing path 313, a shared ink chamber 311, an ink chamber 312 and a nozzle 315 to form a series of spaces through which ink flows and ink 320 is jetted via nozzle 315 onto recording sheet 2 to form an image.

Reference will now be made to FIGS. 5 and 6 to describe the flow of ink in printer head 3.

Ink is supplied from ink cartridge 403 (FIG. 2) via pin 402 (FIG. 2) to printer head 3. The ink is introduced to shared ink chamber 311 via ink introducing path 313 in the printer head. The ink in the shared ink chamber is fed to ink chamber 312.

When voltage is applied across lead frames 314a and 314b, PZT 306 deforms in the vertical direction of FIG. 6. Thus the volume of ink chamber 312 is reduced and ink 320 is thus jetted toward recording sheet 2 (FIG. 1) via nozzle 315.

The degree of deformation of PZT 306 varies in proportion to the voltage applied to PZT 306. By controlling the voltage applied to PZT 306, the amount of ink jetted can be controlled each time the PZT is deformed, to change the size of dots to be printed on a recording sheet.

Figure 7:
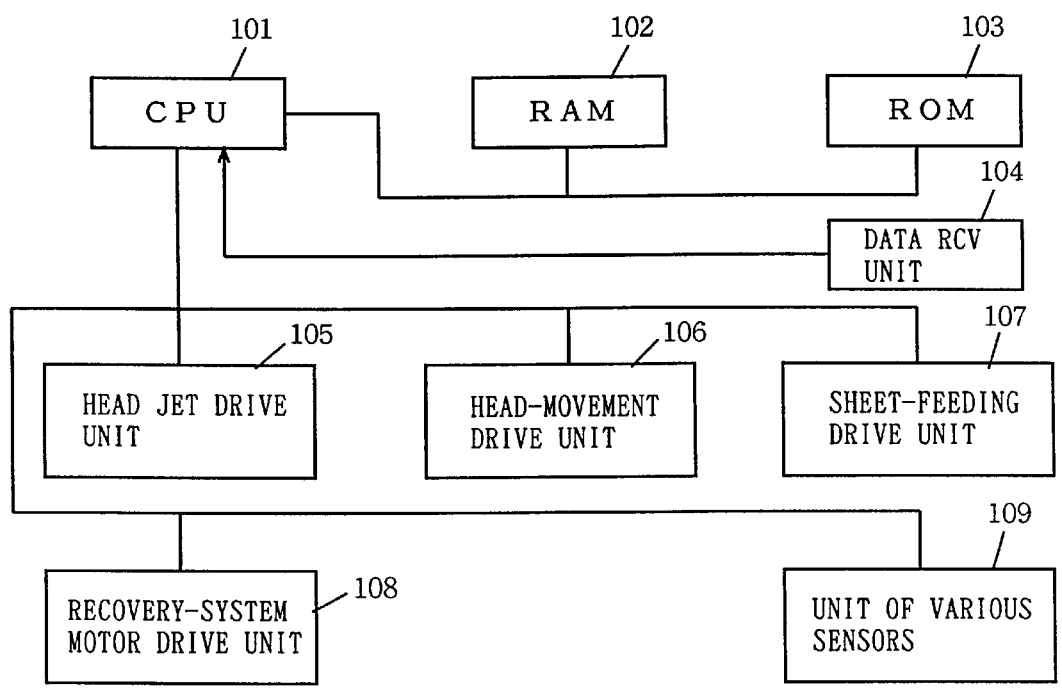
FIG. 7 is a block diagram of a control circuit of an ink jet printer.

FIG. 7 is a block diagram showing a schematic configuration of a control unit of ink jet printer 1.

The control unit of ink jet printer 1 includes a CPU 101, a RAM 102, a ROM 103, a data receiving unit 104, a head jet drive unit 105, a head-movement drive unit 106, a sheet-feeding drive unit 107, a recovery-system motor drive unit 108, and a unit of various sensors 109.

CPU 101, which provides general control, uses RAM 102 as required to run a program stored in ROM 103. The program includes a portion which uses image data read in from data receiving unit 104 to control head jet drive unit 105, head-movement drive unit 106, sheet-feeding drive unit 107 and the unit of various sensors 109 to record an image on recording sheet 2, and a portion which controls recovery-system motor drive unit 108 and the unit of various sensors 109 as required to recover a satisfactory condition of the nozzle surface of printer head 3.

Data receiving unit 104 is connected to a host computer and the like to receive image data to be recorded.

Controlled by CPU 101, head jet drive unit 105 drives the printer head 3 PZT 306, head-movement drive unit 106 drives driving motor 7 which moves carriage 4 carrying printer head 3 in the lateral direction, and sheet-feeding drive unit 107 chives a sheet feeding roller. Also controlled by CPU 101, recovery-system motor drive unit 108 drives a motor required for recovering the satisfactory condition of the printer head 3 nozzle surface.

Figure 8:
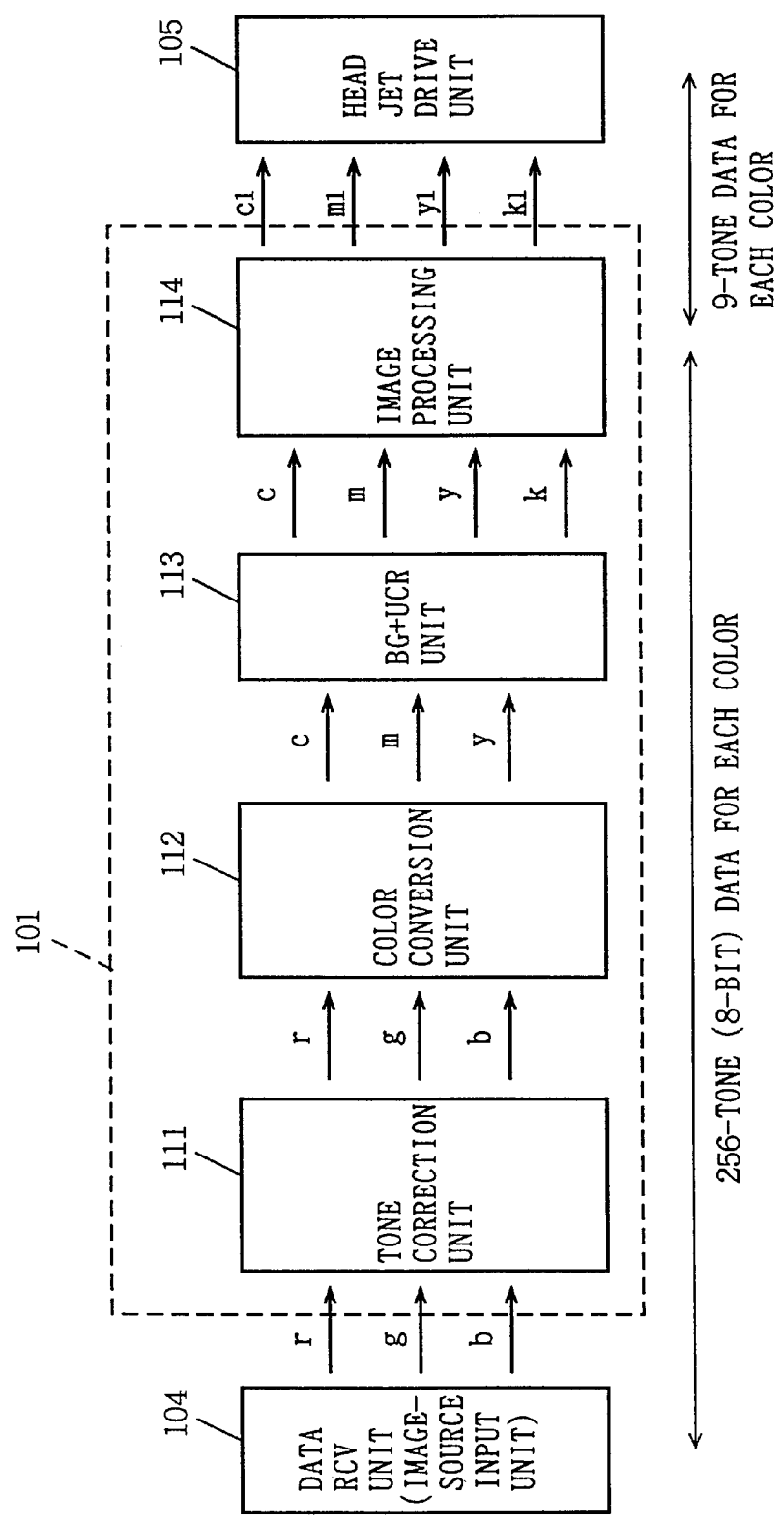
FIG. 8 is a block diagram showing a specific configuration of the FIG. 7 CPU 101.

FIG. 8 is a block diagram showing a configuration of the FIG. 7 CPU 101.

Referring to the figure, CPU 101 includes a tone correction unit 111 receiving signals r, g and b corresponding to the colors of red, green and blue from data receiving unit (or image-source input unit) 104 and applying tone correction thereon, a color conversion unit 112 converting the data of r, g and b subjected to tone correction into the data of c, m and y corresponding to the colors of cyan, magenta and yellow, a black generation+under-color removal (UCR) unit 113 which separates a gray component from the converted signals of the three colors (i.e. under-color removal) and replaces the gray component with a black signal and thus outputs data k corresponding to the color of black, and an image output unit 114 which corrects the resolution of each of the data, binarizes them according to the present embodiment and then outputs data for each color depending on the screen corresponding to the resolution of the printer.

Head jet drive unit 105 receives data from image processing unit 114. Head jet drive unit 105 drives each color-head.

Figure 9:
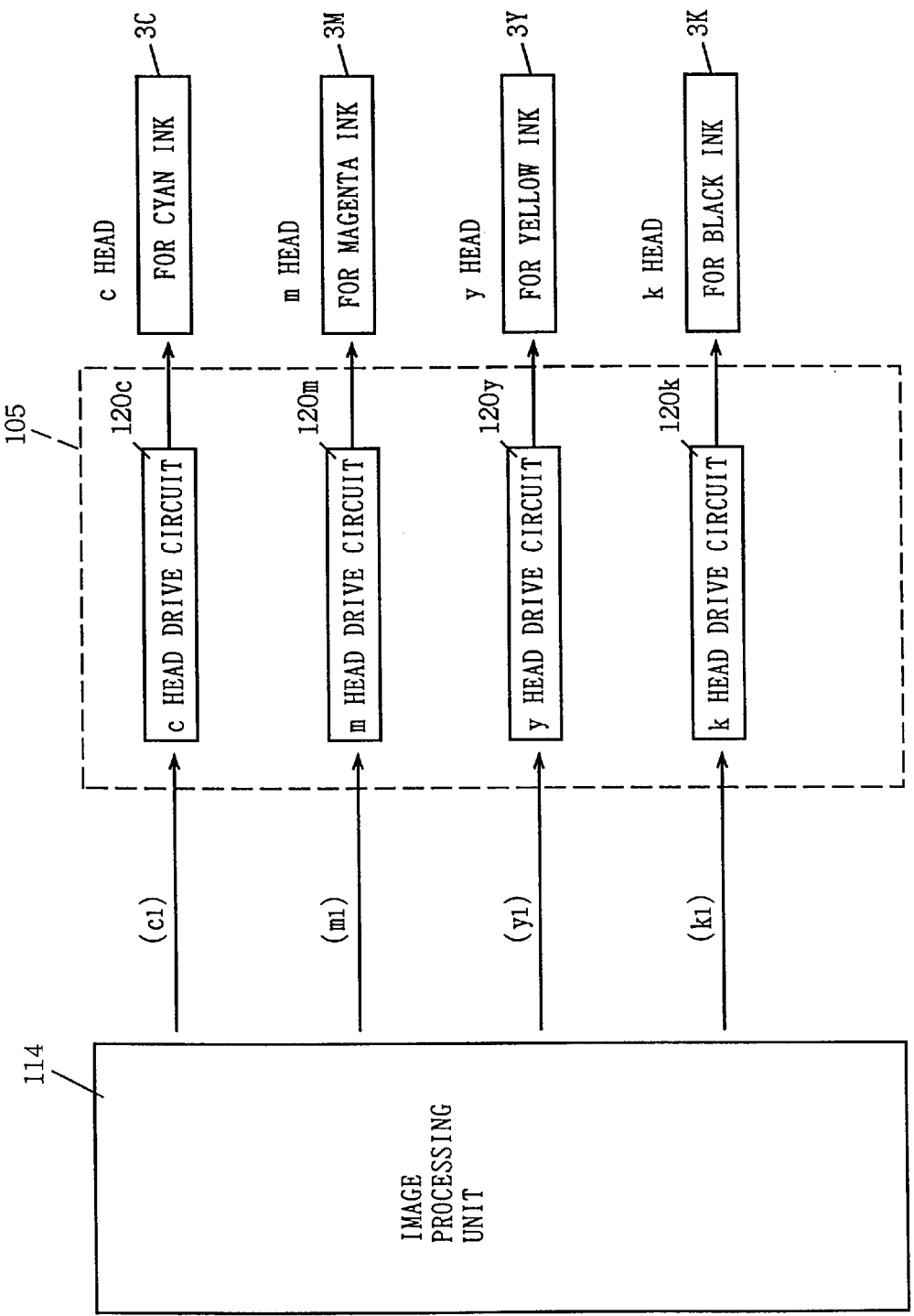
FIG. 9 is a block diagram showing a specific relation between the FIG. 8 image processing unit 114, the FIG. 8 head jet drive unit 105 and each color head.

FIG. 9 is a block diagram showing a relation between the FIG. 8 image processing unit 114, the FIG. 8 had jet drive unit 105, and each color-head.

Referring to the figure, head jet drive unit 105 includes a cyan-head drive circuit 120c driving a head 3C for cyan ink, a magenta-head drive circuit 120m driving a head 3M for magenta ink, a yellow-head drive circuit 120y driving a head 3Y for yellow ink, and a black-head drive circuit 120k driving a head 3K for black ink.

The drive circuits receive from image processing unit 114 their respective data $c_1$, $m_1$, $y_1$ and $k_1$ for driving their respective heads.

FIG. 10 describes a composition of yellow ink used in an ink jet printer of the present embodiment.

The yellow ink contains water of 74.5%, polyhydric alcohol/diethylene glycol (DEG) of 11%, polyhydric alcohol ether/triethylene glycol monobutyl ether (TGB) of 6.5%, and a thickerner/polyethylene glycol (PEG) #400 of 4.5% as the solvent. It also contains a dye/Bayer Y-CA 51092 of 2.5% as a coloring material. It also contains a surfactant/Olfine E1010 of 0.8% and a pH adjusting agent/$NaHCO_3$ of 0.2% as additives.

FIG. 11 describes a composition of magenta ink used in an ink jet printer of the present embodiment.

The magenta ink contains water of 74.5%, polyhydric alcohol/DEG of 11%, polyhydric alcohol ether/TGB of 6.5%, and a thickener/PEG #400 of 4.5% as the solvent. It also contains a dye/BASF RED FF-3282 of 2.5% as a coloring material. It also contains a surfactant/Olfine E1010 of 0.8% and a pH adjusting agent/$NaHCO_3$ of 0.2% as additives.

FIG. 12 describes a composition of cyan ink used in an ink jet printer of the present embodiment.

The cyan ink contains water of 74%, polyhydric alcohol/DEG of 11%, polyhydric alcohol ether TGB of 6.5%, a thickener/PEG #400 of 4.5% as the solvent. It also contains a dye/Bayer CY-BG of 3.0% as a coloring material. It also contains a surfactant/Olfine E1010 of 0.8% and a pH adjusting agent/$NaHCO_3$ of 0.2% as additives;

FIG. 13 describes a composition of black ink used in an ink jet printer of the present embodiment.

The black ink contains water of 77.9%, polyhydric alcohol/DEG of 6.0%, polyhydric alcohol ether/TGB of 6.0%, and a thickener/PEG #400 of 4.5% as the solvent. It also contains a dye/Bayer BK-SP of 4.6% as a coloring material. It also contains a surfactant/Olfine E1010 of 0.8% and a pH adjusting agent/$NaHCO_3$ of 0.2% as additives.

Figure 14:
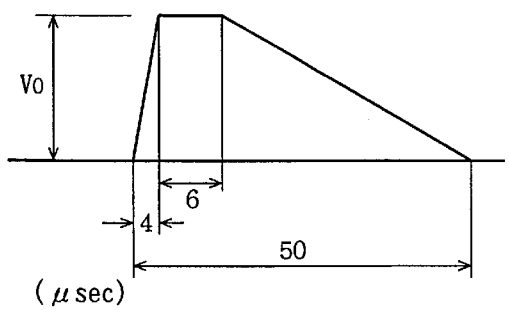
FIG. 14 represents a waveform of a voltage applied to a PZT 306.

FIG. 14 shows a waveform of a pulse of a voltage applied to PZT 306.

Referring to the figure, PZT 306 receives a voltage $V_0$ which varies depending on the diameter (or size) of the dot to be printed. It requires 4 µsec from initiation of the voltage application until the voltage attains the value of $V_0$. Then voltage $V_0$ is applied for 6 µsec. Then the voltage takes 40 µsec to attain zero. In other words, the application time of one pulse is 50 µsec in total.

Figure 15:
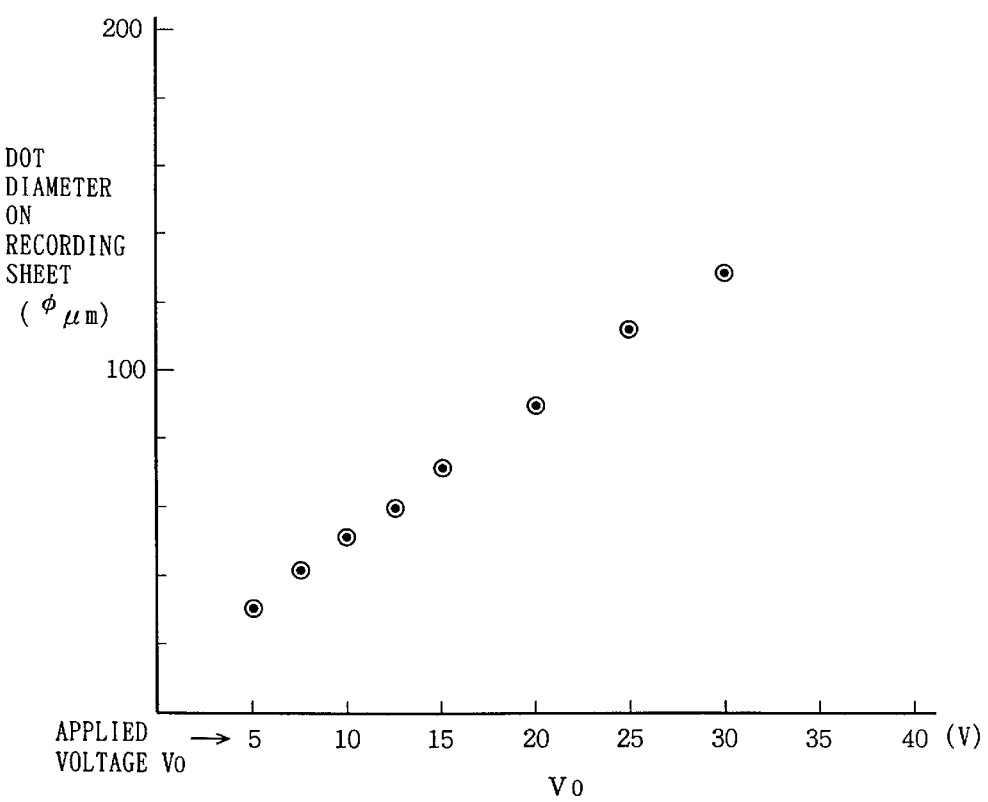
FIG. 15 is a graph of a voltage applied to PZT 306 versus a diameter of a dot on a recording sheet 2.

FIG. 15 is a graph of the diameter (µm) of a dot on recording sheet 2 when voltage $V_0$ is applied to PZT 306 versus the application of voltage $V_o$ to PZT 306.

As shown in the figure, the diameter of the dot on recording sheet 2 increases as the voltage applied is increased.

Figure 16:
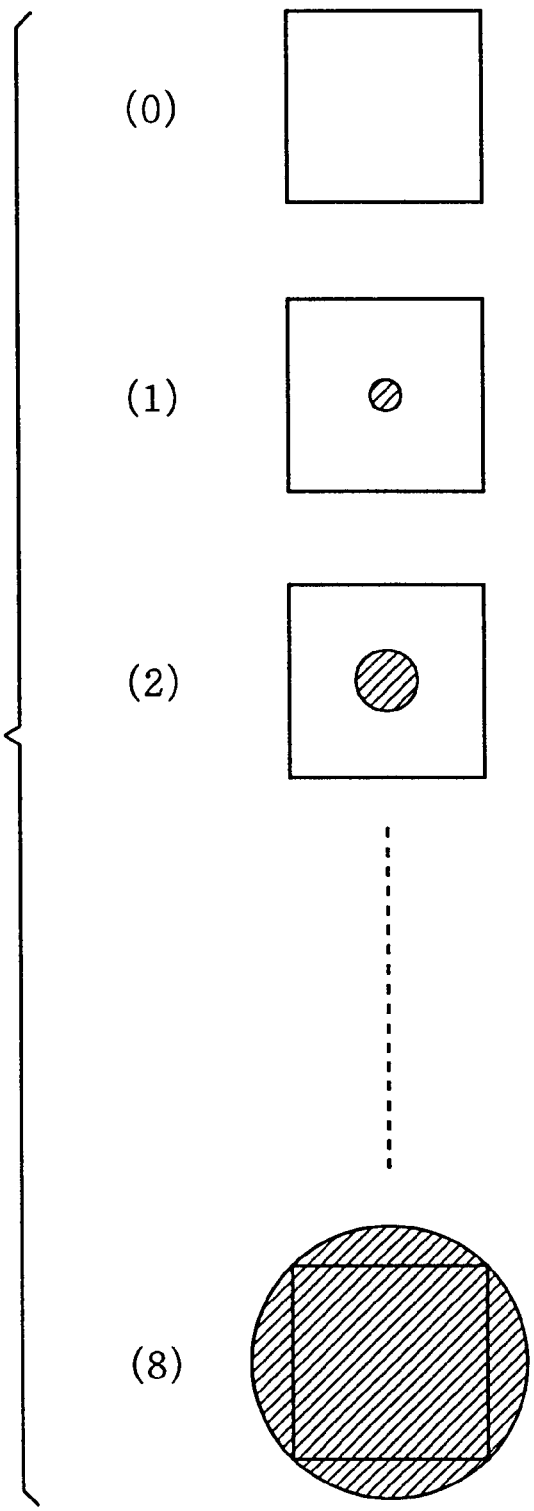
FIG. 16 shows a relation between tones 0 to 8 and dot diameter.

In the present embodiment, voltage $V_0$ applied to PZT 306 is varied between 0V, 5V, 7.5V, 10V, 12.5V, 15V, 20V, 25V and 30V to change dot size between tones 0 to 8 as shown in FIG. 16 to provide an 8-tone representation.

Figure 17:
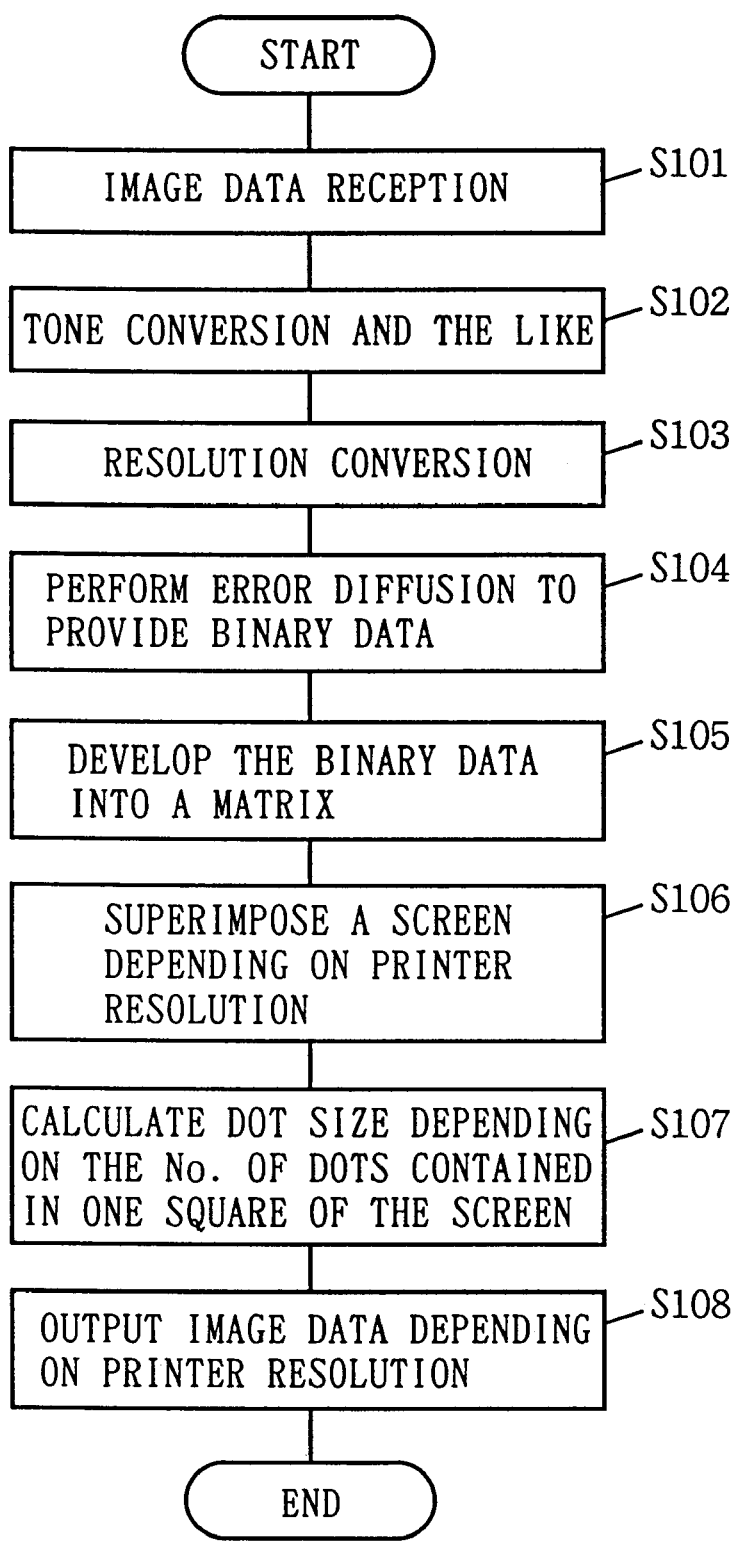
FIG. 17 is a flow chart of a printing process performed by the ink jet printer according to the first embodiment.

FIG. 17 is a flow chart of a printing process performed by an ink jet printer according to the present embodiment.

Referring to the figure, at step S101, image data is received via data receiving unit 104. At step S102, the received image data is corrected by tone correction unit 111 to have a tone level suitable for an image process. Other processes, such as color conversion and black generation, are also performed at step S102.

At step S 103, the image data is converted to have a resolution appropriate for a subsequent image process to allow for a tone process using an FM method at a resolution larger than that of the printer used. For example, when the printer has a resolution of 360 dpi and the tone process is performed at a resolution four times larger than the resolution of the printer, the input image data is converted to have a resolution of 1440 dpi.

At step S 104, an FM method such as error diffusion is used to apply the tone process on image data. The image data thus becomes binary data.

At step S105, the binary data is developed into a matrix. At step S106, a screen depending the resolution of the printer used is superimposed on the image data developed into the matrix at step S106.

Figures 18, 19:
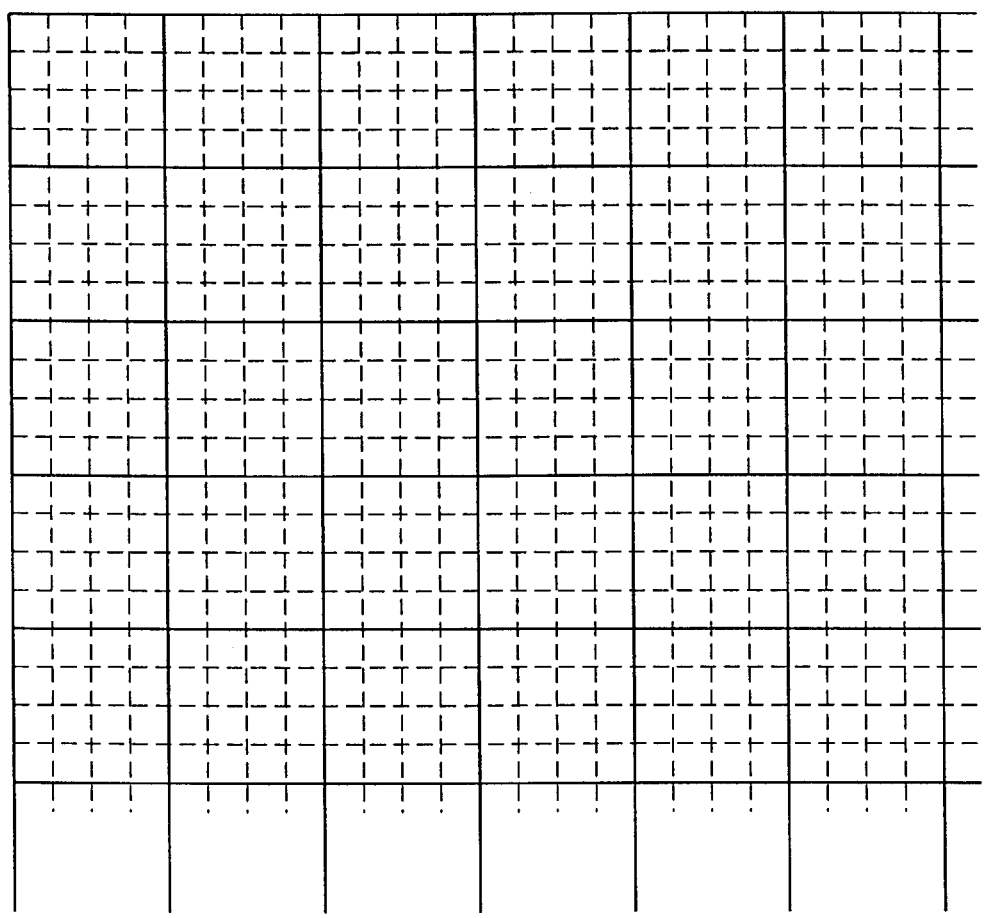
FIG. 18 shows a relation between a screen depending on a resolution of a printer and a matrix for processing an image.
FIG. 19 illustrates a matrix included in one square of a screen.

Referring now to FIG. 18, when the matrix into which the image data is developed is represented with broken line the grid represented with solid line corresponds to a screen depending on the resolution of the printer used, since the resolution of the printer is lower than that of the matrix.

At step S107, the size of a dot to be printed by the printer is obtained depending on the number of dots contained in one square of the screen. At step S108, image data depending on the resolution of the printer is printed, depending on the dot size obtained.

The dot-size determination actually made at the FIG. 17 step S107 will now be described.

FIG. 19 is an enlarged view of one square included in a screen depending on the resolution of the printer represented in solid line as shown in FIG. 18.

Referring to FIG. 19, one square contains 16 pixels a1 to a16 provided within a matrix into which image data is developed. The size of a dot to be printed is obtained depending on the number of dots (the number of data "1") in pixels a1 to a16.

Figure 20:
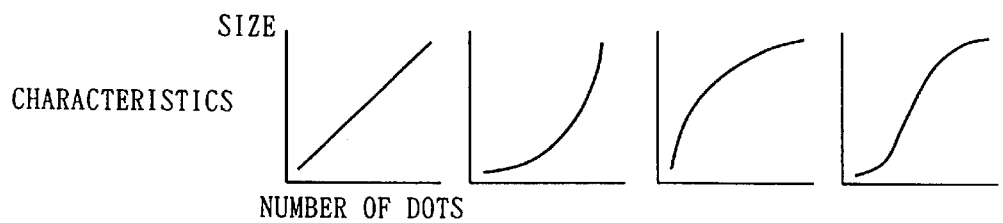
FIG. 20 represents a relation between the number of dots included in one square and the sizes of dots.

FIG. 20 represents a relation between the number of dots contained in the square and the size of a dot to be printed.

In the present embodiment, any of characteristics γ1 to γ4 can be selected as a correspondence between the number of dots contained in one square and dot size. This selection may depend on the user's favor or may be changed via a printer driver.

More specifically, any of dot sizes 0 to 8 is determined depending on any number of dots, i.e. 0 to 16, contained in one square as shown in FIG. 19.

It should be noted that as shown in FIG. 20, characteristic γ1 represents a linear relationship, γ2 a downwardly curved relationship, γ3 an upwardly curved relationship and γ4 an S-shaped relationship between the number of dots and dot size.

An effect of an ink jet printer according to the present embodiment will now be described.

Figure 21:
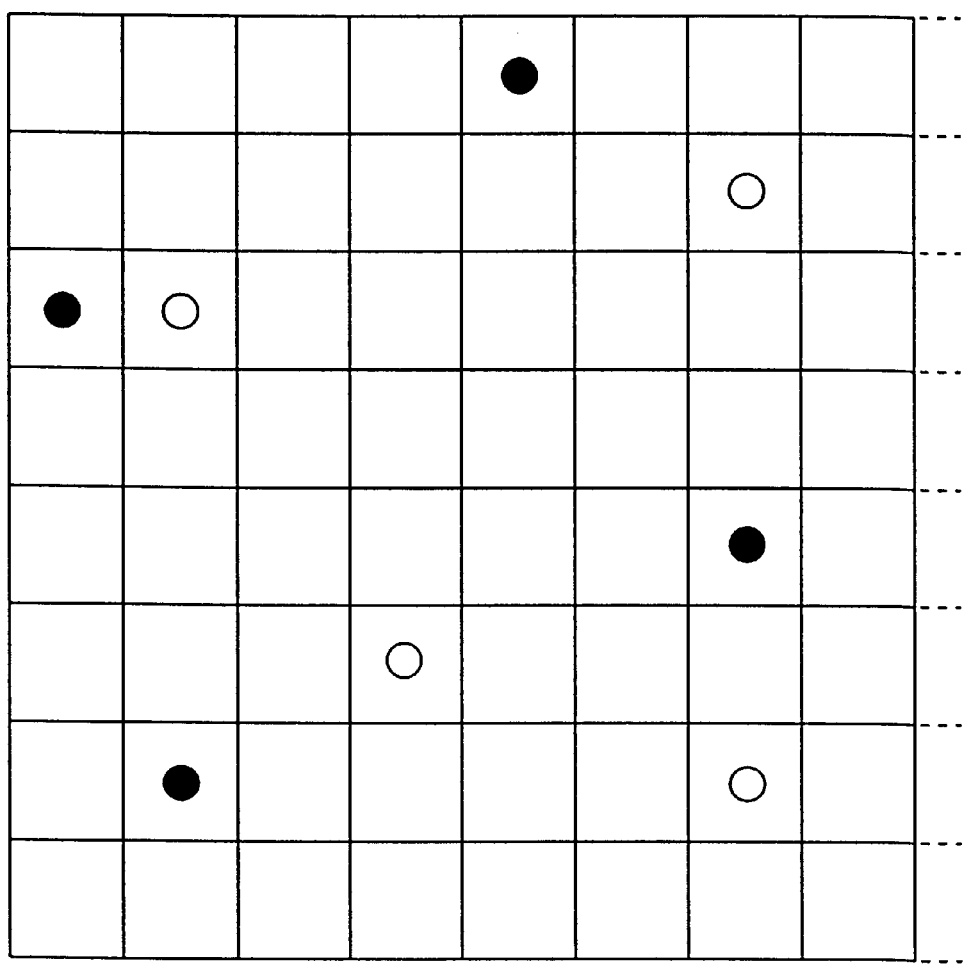
FIG. 21 shows one example of an image output from a printer.

FIG. 21 is an enlarged view of an image output from the ink jet printer according to the present embodiment. The black dots in the figure represent those printed in ink of a color and the white dots in the figure represent those printed in ink of a different color.

As is apparent from the figure, the present embodiment uses error diffusion and dots are thus printed randomly. This prevents generation of a pattern in output dots, as with a dither method, and thus prevents significant mechanical noises from the printer.

Since dots are printed randomly, any secondary noise of frequency can be prevented if colors are superimposed on one another. Furthermore, the smearing and bleeding of ink can be prevented, since dots of various colors are hardly superimposed on one another.

Furthermore, a printer having a single resolution can provide a smaller dot to form an image at a less dense portion to form as fine an image as that provided by a printer higher in resolution. Furthermore, larger dots can be used at denser portions to process images rapidly.

Furthermore, in accordance with the present embodiment a tone process according to an FM method can be initially performed and a dot size can then be obtained to reduce a patterned noise in intermediate tones that is characteristic to error diffusion.

Figure 22:
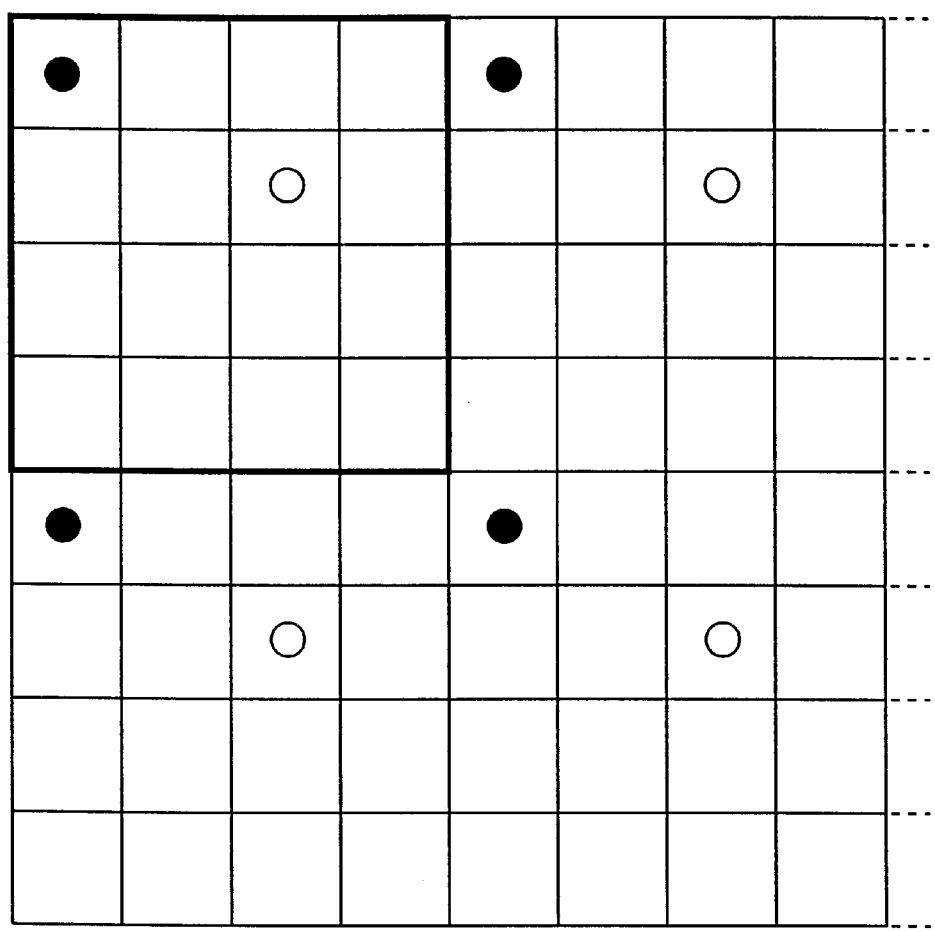
FIG. 22 shows one example of an output image, using a conventional dither method.

FIG. 22 is a view for illustrating an image output when only the dither method is used. In the figure, the area surrounded by the wide line corresponds to one dither matrix.

As is apparent from the figure, when the dither method is employed dots are printed periodically. Thus any mechanical noise generated will be noticeable.

Figure 23:
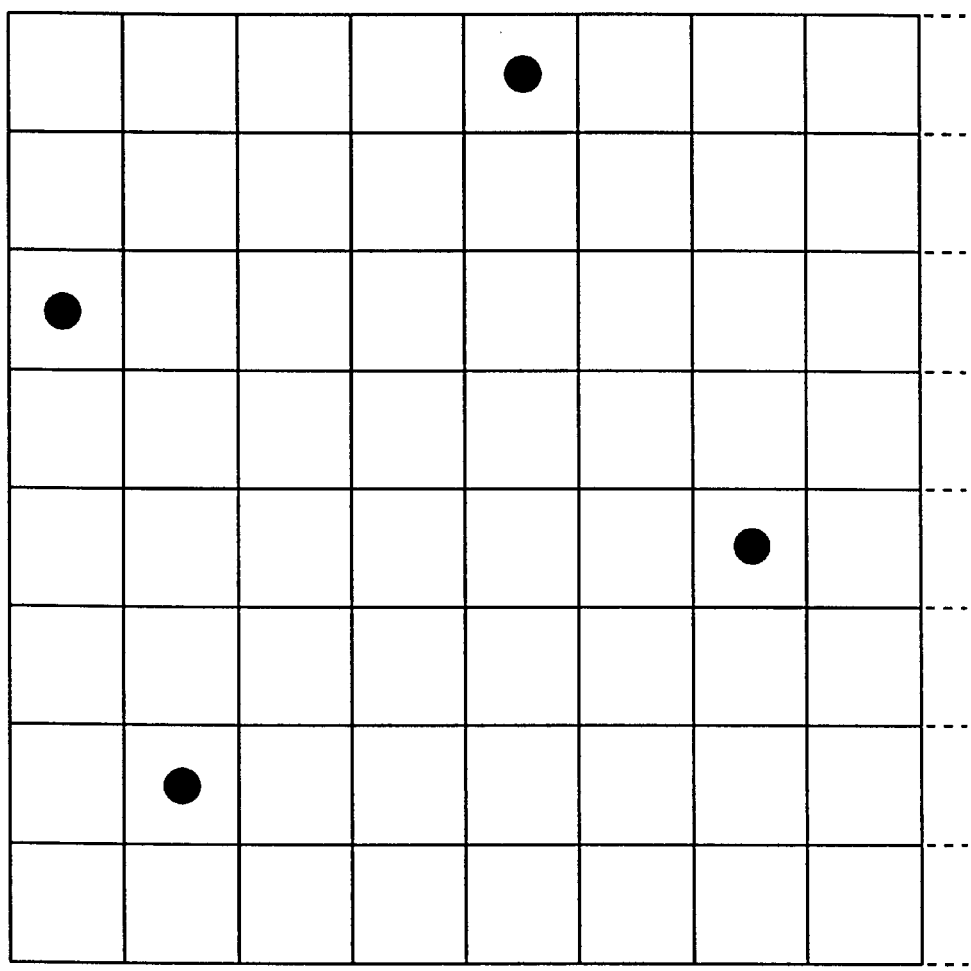
FIG. 23 shows one example of an image output from the printer according to the first embodiment.
Figure 24:
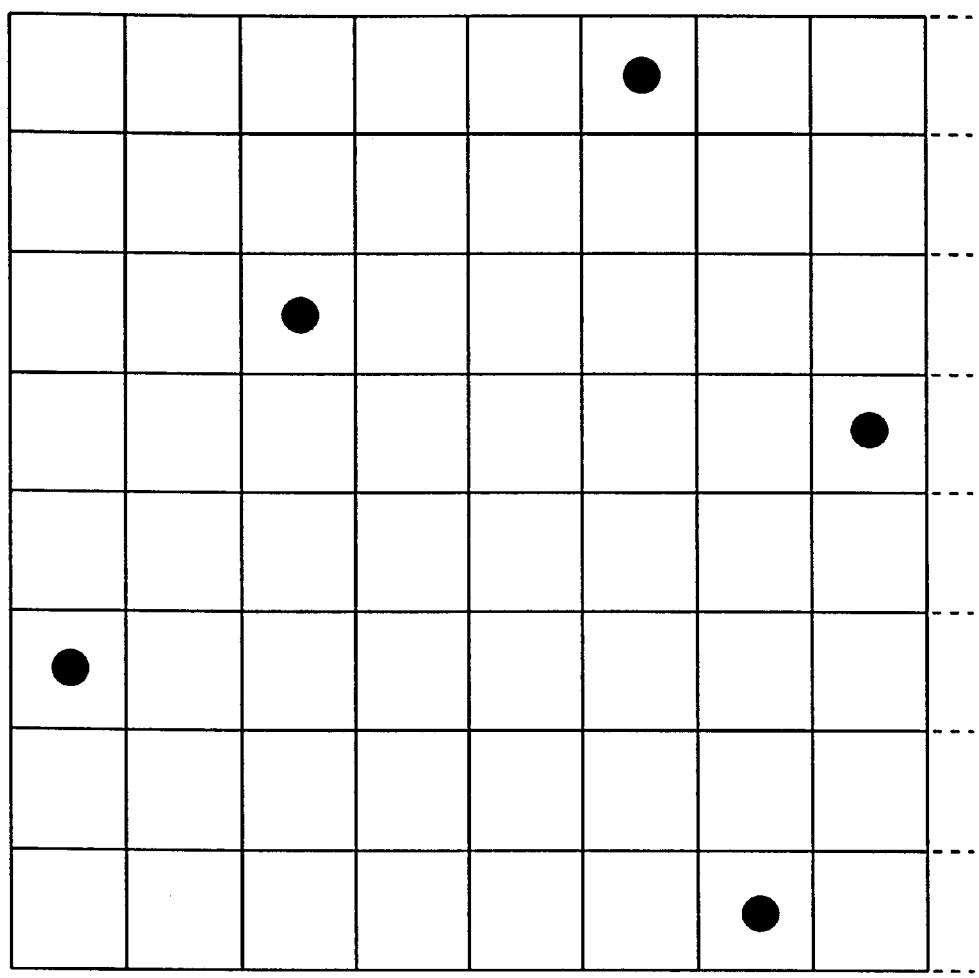
FIG. 24 shows an image darker by one stage than the image shown in FIG. 23.

FIG. 23 represents an image output from an ink jet printer of the present embodiment as a matrix of eight by eight, and FIG. 24 shows the FIG. 23 pattern with the density increased by one stage.

Figure 25:
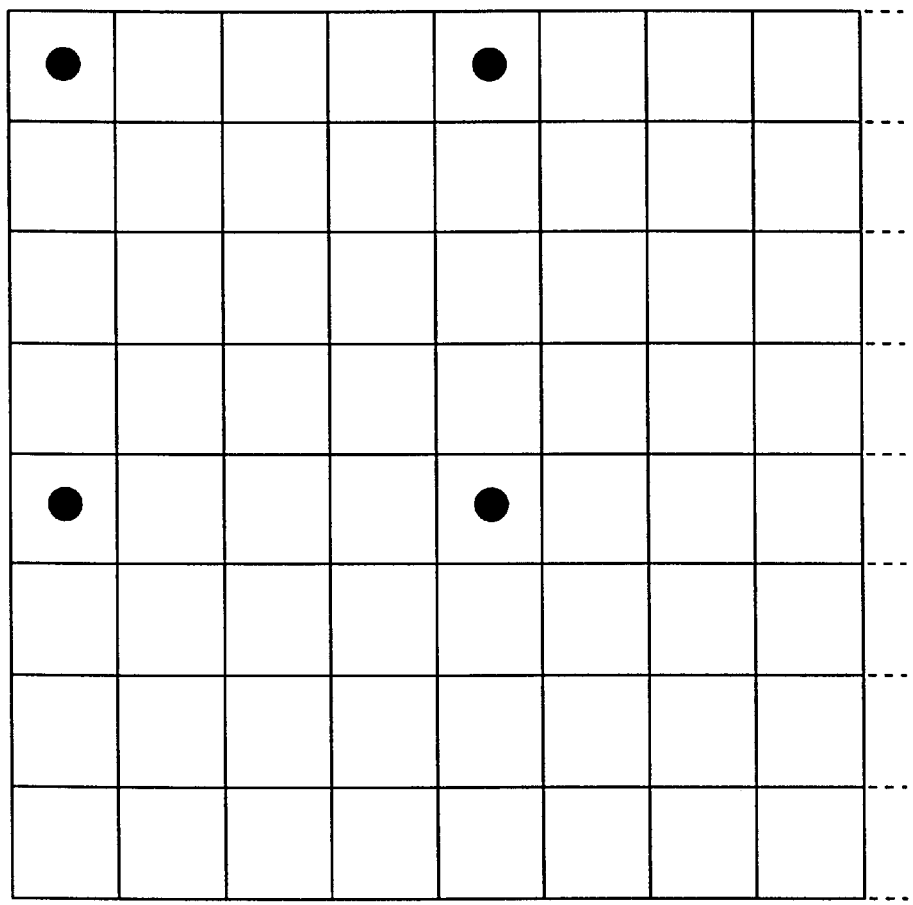
FIG. 25 shows one example of an image output according to a conventional dither method.
Figure 26:
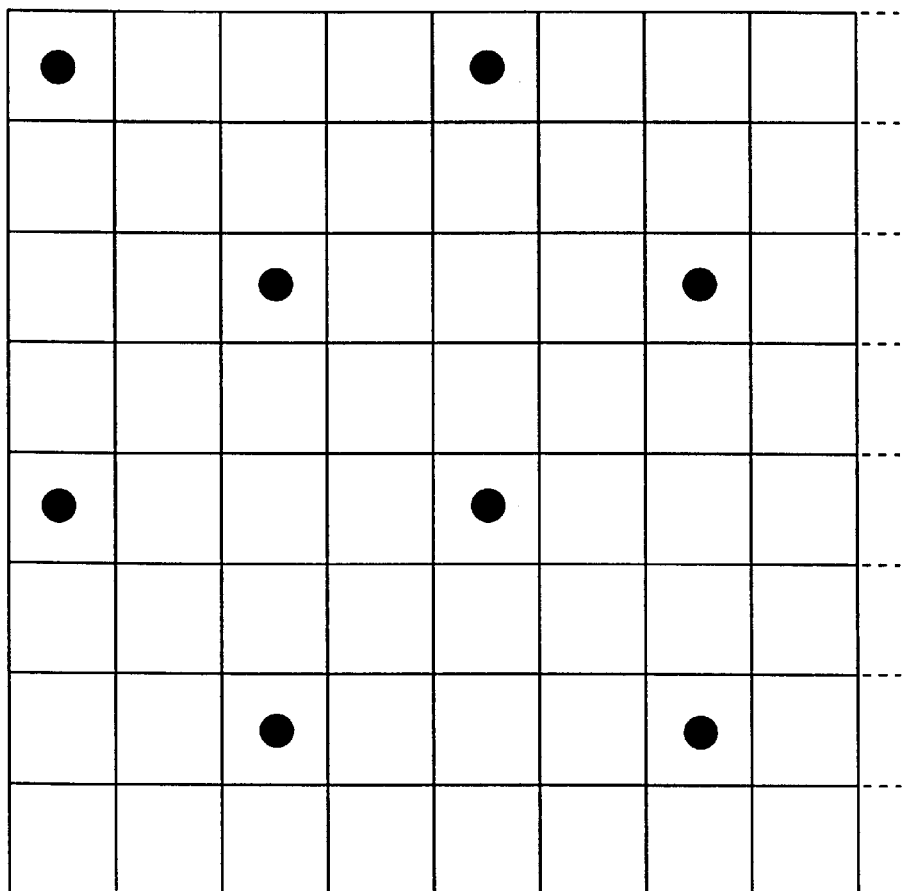
FIG. 26 shows an image darker by one stage than the image shown in FIG. 25.

For the dither method, increasing the number of tones to output a low-density intermediate tone requires a larger dither matrix and this disadvantageously results in a lower resolution. By contrast, the present embodiment, basically employing error diffusion, can be free from such a problem and also achieve fine changes in density. That is, when a dither matrix of four by four in size is used according to the dither method, an image having its density increased from that shown in FIG. 25 by one stage in density is as shown in FIG. 26. This shows that when the dither method is employed, increasing a density by one stage doubles the density. The present embodiment is free from such a disadvantage.

Figure 27:
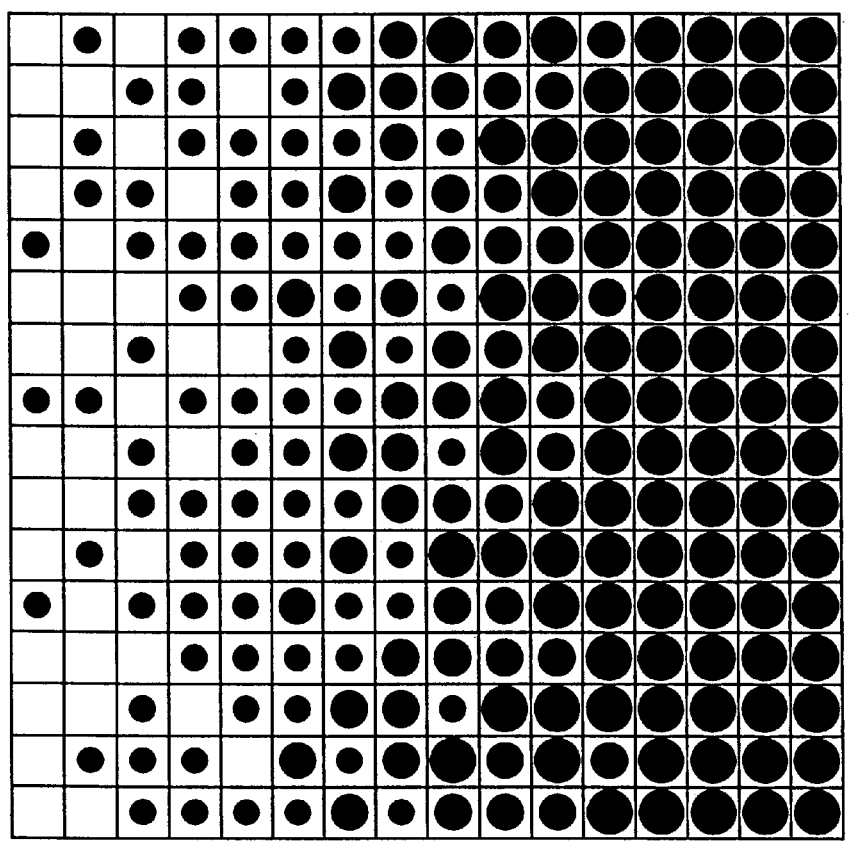
FIG. 27 shows an image output from a printer according to the present embodiment.

FIG. 27 shows an exemplary image output from an ink jet printer according to the present embodiment, and FIG. 28 shows the FIG. 27 image that is output only according to a conventional error diffusion.

As shown in FIG. 27, in accordance with the present embodiment, error diffusion is initially performed and a dot diameter is then modified to perform a tone process (an areal tone method). Thus, smooth representation can be achieved when the density of an image shifts. By contrast, it is difficult for the conventional error diffusion using uniform dots to represent smooth shift in image data.

Second Embodiment

An ink jet printer according to a second embodiment of the present invention is characterized in that the size of dots to be printed is divided into four stages and in that four pixels correspond to one square contained in the screen depending on the resolution of the printer.

Figure 29:
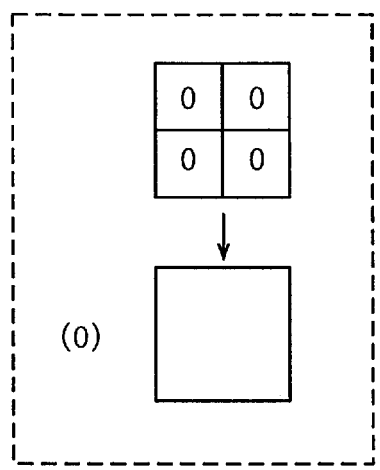
FIGS. 29–33 represent a relation between matrix and dot size according to a second embodiment.

More specifically, any dot is not printed or tone 0 is provided when the four pixels contained in one square of the screen are all "0", as shown in FIG. 29.

Figure 30:
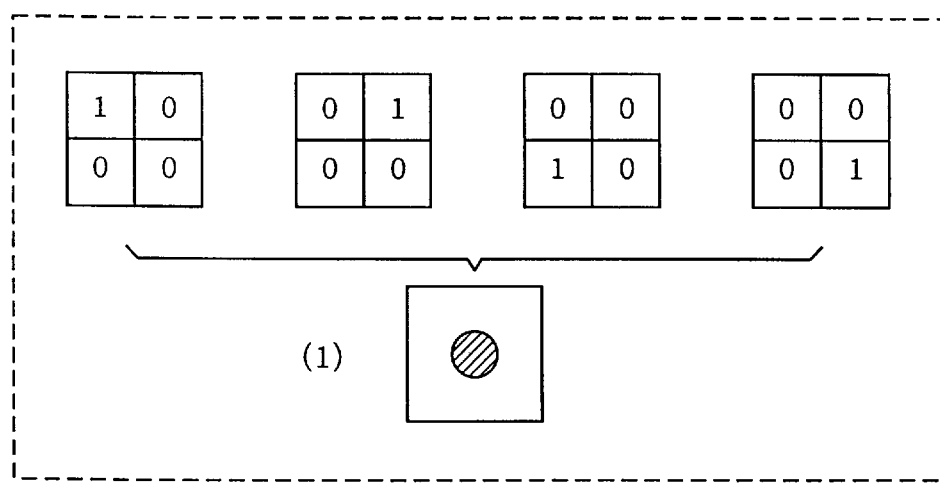

When one of the four pixels is "1" or in the state at which a dot is printed, the smallest dot is printed or tone 1 is provided, as shown in FIG. 30.

Figure 31:
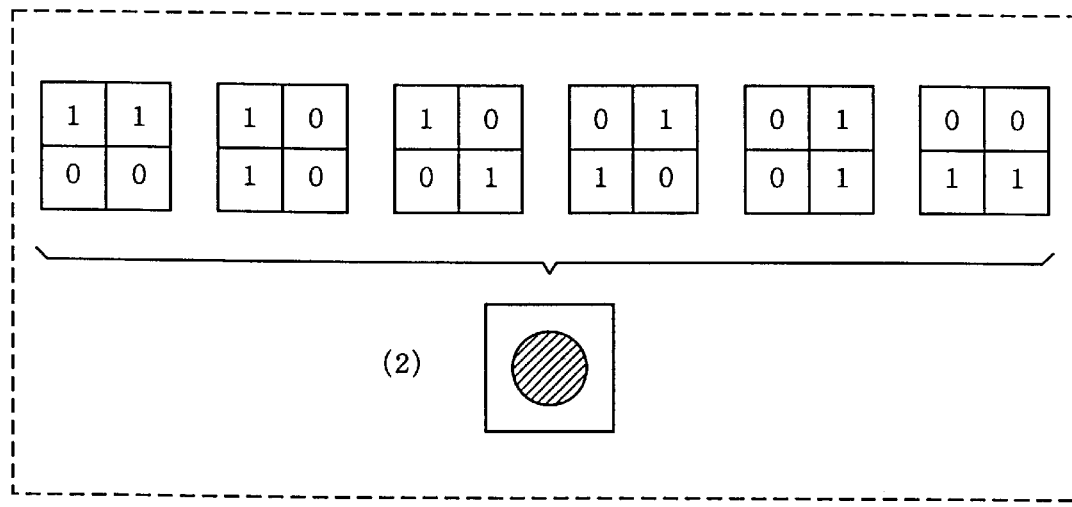

When there are two pixels indicative of a "1", the second smallest dot is printed or tone 2 is provided, as shown in FIG. 31.

Figure 32:
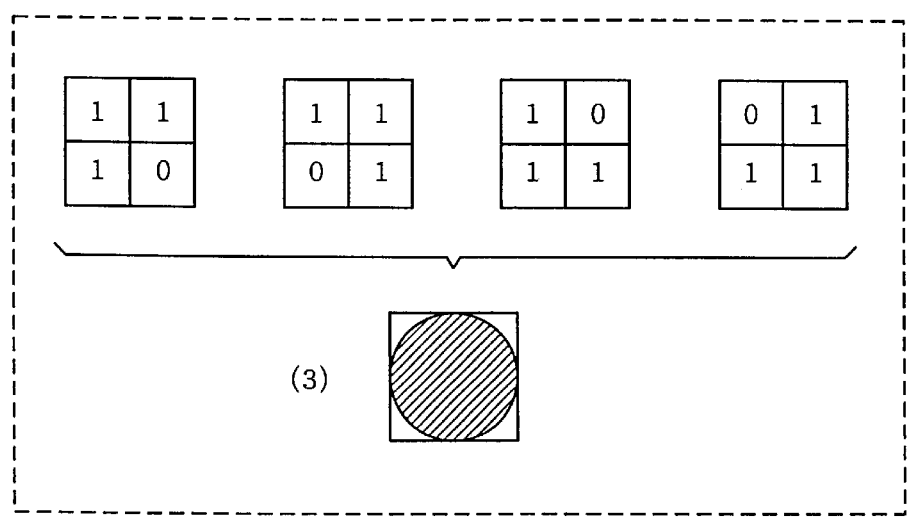

When there are three pixels indicative of a "1", the third smallest dot is printed or tone 3 is provided, as shown in FIG. 32.

Figure 33:
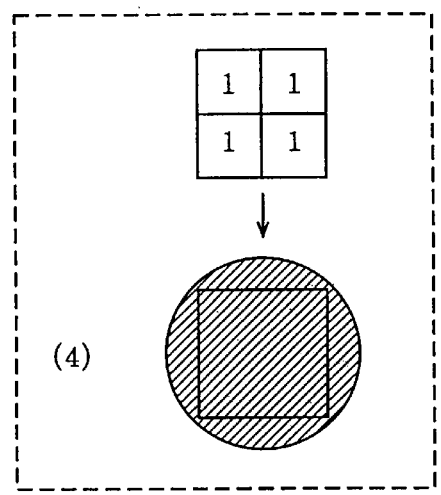

When all of the pixels indicate a "1", the largest dot is printed or tone 4 is provided, as shown in FIG. 33.

Figure 34:
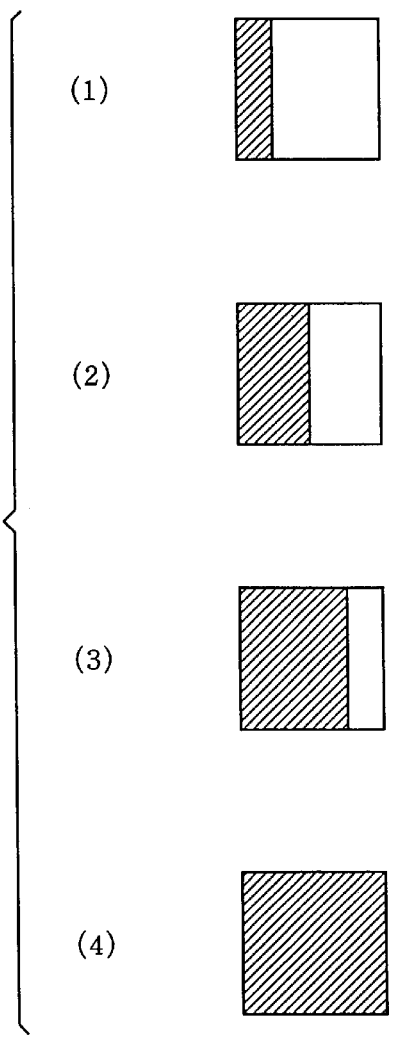
FIG. 34 is a view for describing a variation of the printer according to the second embodiment.

Thus in contrast with the first embodiment the present embodiment does not require the correspondency table shown in FIG. 20. Thus the procedure of processing images can be simplified. It should be noted that the above tones 1 to 4 that are adapted to correspond to the tones 1 to 4 of a laser beam printer, as shown in FIG. 34, to print images allows the present invention applicable to the laser beam printer.

Furthermore, the present invention is also applicable to heat-transfer printers if heat application time or the number of pulses for heat application is changed depending on the tone.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus comprising:
   a first processing unit applying a tone process on input image data; and
   a second processing unit determining a size of a dot to be printed from data of a plurality of pixels contained in the image data having been subjected to said tone process, wherein the dot replaces the plurality of pixels in output image data of the second processing unit.

2. The image processing apparatus according to claim 1, wherein said second processing unit superimposes a grid depending on a resolution of a printer onto the image data having been subjected to said tone process to determine the dot size depending on a number of dots contained in one square of the grid.

3. The image processing apparatus according to claim 1, wherein said tone process is performed through frequency modulation.

4. The image processing apparatus according to claim 1, wherein said tone process is performed through error diffusion.

5. The image processing apparatus according to claim 1, further comprising a resolution converting unit converting a resolution of an image prior to the process performed by said first processing unit.

6. The image processing apparatus according to claim 5, wherein said resolution converting unit converts image data so that the image data has a resolution higher than a resolution of a printer.

7. The image processing apparatus according to claim 1, wherein said second processing unit determines the dot size depending on a relationship between the data of said plurality of pixels and a resolution of a printer.

8. The image processing apparatus according to claim 1, wherein said second processing unit determines the dot size depending on a number of dots contained in a predetermined region depending on a resolution of a printer.

9. The image processing apparatus according to claim 8, wherein a relationship between the number of dots and the dot size depends on one of various types of relationships.

10. The image processing apparatus according to claim 1, wherein a previously prepared table is used to determine the dot size.

11. An image processing method comprising the steps of:
applying a tone process on input image data; and
determining a size of a dot to be printed from data of a plurality of pixels contained in the image data having been subjected to said tone process, wherein the dot replaces the plurality of pixels in output image data.

12. An image processing method according to claim 11, wherein said step of determining includes superimposing a grid depending on a resolution of a printer onto the image data having been subjected to said tone process to determine the dot size depending on a number of dots contained in one square of the grid.

13. An image processing method according to claim 11, wherein said tone process is performed through frequency modulation.

14. An image processing method according to claim 11, wherein said tone process is performed through error diffusion.

15. An image processing method according to claim 11, further comprising the step of converting a resolution of an image prior to said tone process.

16. An image processing method according to claim 15, wherein said step of converting includes converting image data so that the image data has a resolution higher than a resolution of a printer.

17. An image processing method according to claim 11, wherein said step of determining includes determining the dot size depending on a relationship between the data of said plurality of pixels and a resolution of a printer.

18. An image processing method according to claim 11, wherein said step of determining includes determining the dot size depending on a number of dots contained in a predetermined region corresponding to a resolution of a printer.

19. An image processing method according to claim 18, wherein a relationship between the number of dots and the dot size depends on one of various types of relationships.

20. An image processing method according to claim 11, wherein a previously prepared table is used to determine the dot size.

21. A method for processing an image, comprising the steps of: dividing the image including an array of pixels into a plurality of subarrays; for at least one subarray:
determining the density of pixels of a color within the subarray; and
replacing the subarray with a replacement pixel of the color, the replacement pixel having a size determined by the density of pixels of the color within the subarray.

22. A method for processing an image according to claim 21, wherein said step of replacing includes determining the dot size depending on a number of dots contained in the subarray corresponding to a resolution of a printer.

23. A method for processing an image according to claim 21, further comprising the step of printing the image with the replacement pixel replacing the subarray within the image.

24. A method for processing an image according to claim 21, further comprising the step of generating an ink jet droplet corresponding to the replacement pixel.

25. A method for processing an image according to claim 21, further comprising the step of printing the replacement pixel using a laser printer wherein the size of the replacement pixel is generated by filing a portion of the pixel with the color in correspondence with the size of the replacement pixel.

26. A printer comprising:
a processor for processing an image received for printing, wherein the processor divides the image including an array of pixels into a plurality of subarrays and, for at least one subarray:
determines the density of pixels of a color within the subarray; and
replaces the subarray with a replacement pixel of the color, the replacement pixel having a size determined by the density of pixels of the color within the subarray; and
a print head for receiving the image processed by the processor and printing the image processed by the processor onto a medium.

27. A printer according to claim 26, wherein said processor determines the dot size depending on a number of dots contained in the subarray corresponding to a resolution of the printer.

28. A printer according to claim 26, wherein the print head prints the replacement pixel by generating an ink jet droplet corresponding to the replacement pixel.

29. A printer according to claim 26, wherein the print head prints the replacement pixel using a laser printer wherein the size of the replacement pixel is generated by filing a portion of the pixel with the color in correspondence with the size of the replacement pixel.

30. An image processing apparatus comprising:
a binarizing unit for binarizing image data and thereby generating binarized image data having a first resolution; and
a multi-toning unit for generating multi-tone image data having a second resolution from the binarized image data, the second resolution being lower than the first resolution.

31. An image processing apparatus as claimed in claim 30, wherein the binarization of the image data is performed through a frequency modulation.

32. An image processing apparatus as claimed in claim 30, wherein the binarization of the image data is performed through an error diffusion.

33. An image processing apparatus as claimed in claim 30, further comprising:
- a resolution converting unit for converting a resolution of the image data, wherein the binarizing unit binarizing the image data that have processed by the resolution converting unit.

34. An image processing apparatus as claimed in claim 33, wherein the image data processed by the resolution converting unit have the first resolution.

35. An image processing apparatus as claimed in claim 34, wherein the first resolution is higher than a resolution of an output unit.

36. An image processing apparatus as claimed in claim 30, wherein the second resolution matches a resolution of an output unit.

37. An image processing apparatus as claimed in claim 30, wherein the multi-toning unit determines a tone level of each pixel of the multi-tone image data by referring a plurality of pixels of the binarized image data.

\* \* \* \* \*